(12) United States Patent
Graber et al.

(10) Patent No.: US 9,555,353 B2
(45) Date of Patent: Jan. 31, 2017

(54) CHANNEL DEPTH FILTRATION MEDIA

(71) Applicant: Kuss Filtration, Inc., Findlay, OH (US)

(72) Inventors: Julie Anne Graber, Findlay, OH (US); Gary L. Rickle, Wharton, OH (US); Dale Ray Estepp, Smyrna, DE (US); Andrew Gordon Platt, Middletown, DE (US)

(73) Assignee: Kuss Filtration, Inc., Findlay, OH (US)

( * ) Notice: Subject to any disclaimer, the term of this patent is extended or adjusted under 35 U.S.C. 154(b) by 531 days.

(21) Appl. No.: 14/158,186

(22) Filed: Jan. 17, 2014

(65) Prior Publication Data

US 2014/0202951 A1 Jul. 24, 2014

Related U.S. Application Data

(60) Provisional application No. 61/754,329, filed on Jan. 18, 2013.

(51) Int. Cl.
| | | |
|---|---|---|
| *B01D 24/00* | (2006.01) | |
| *B01D 39/16* | (2006.01) | |
| *B01D 35/00* | (2006.01) | |
| *B01D 39/08* | (2006.01) | |
| B01D 39/00 | (2006.01) | |

(52) U.S. Cl.
CPC ......... *B01D 39/1623* (2013.01); *B01D 35/005* (2013.01); *B01D 39/083* (2013.01)

(58) Field of Classification Search
CPC ..... B01D 24/00; B01D 24/001; B01D 24/007; B01D 39/00; B01D 39/02; B01D 39/0083; B01D 39/1623; B01D 39/06; B01D 39/08; B01D 39/14; B01D 39/16; B01D 39/1607; B01D 35/005

USPC .......... 210/167.02, 167.08, 167.31, 172.1,210/172.2, 483, 484, 489, 499, 503, 505; 96/4

See application file for complete search history.

(56) References Cited

U.S. PATENT DOCUMENTS

| | | | | |
|---|---|---|---|---|
| 5,252,207 A * | 10/1993 | Miller | ........... | B01D 29/012 210/335 |
| 5,552,048 A | 9/1996 | Miller et al. | | |
| 5,716,522 A * | 2/1998 | Chilton | ........... | B01D 29/111 210/317 |
| 5,902,480 A * | 5/1999 | Chilton | ........... | B01D 29/012 210/317 |
| 7,927,400 B2 * | 4/2011 | Graber | ........... | B01D 39/1623 210/243 |
| 8,080,086 B2 | 12/2011 | Graber | | |
| 8,277,655 B2 | 10/2012 | Wieczorek | | |
| 2006/0266701 A1 * | 11/2006 | Dickerson | ......... | B01D 39/1623 210/503 |

FOREIGN PATENT DOCUMENTS

EP 1785262 A1 5/2007

OTHER PUBLICATIONS

International Search Report for PCT/US2014/012048, dated Jun. 11, 2014.

* cited by examiner

*Primary Examiner* — Allison Fitzsimmons
(74) *Attorney, Agent, or Firm* — Brinks Gilson & Lione

(57) ABSTRACT

A fluid filtration media is disclosed that incorporates a channel depth layer to prevent collapse between media layers for increased filtration efficiency while maintaining increased filter life.

23 Claims, 7 Drawing Sheets

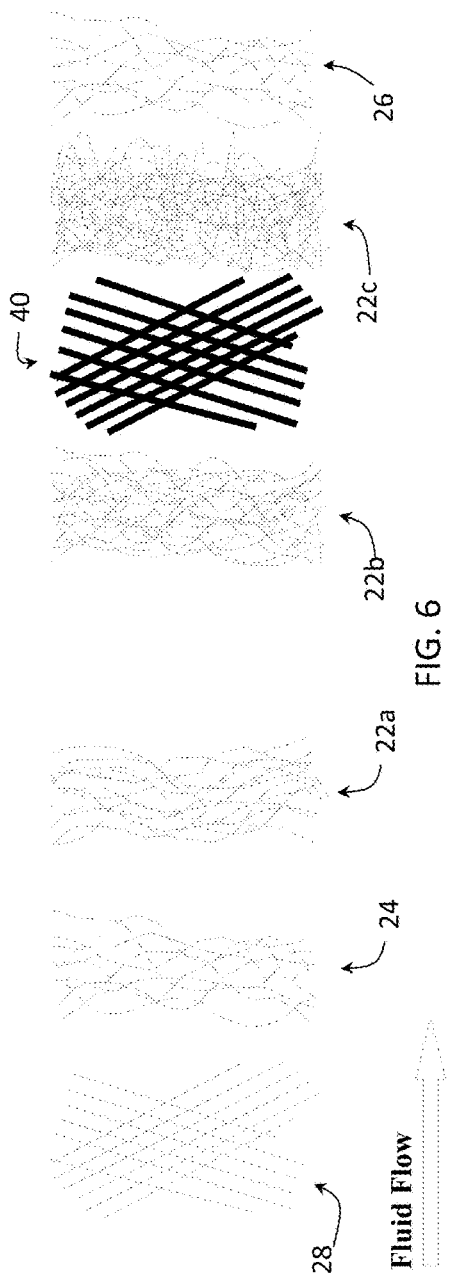
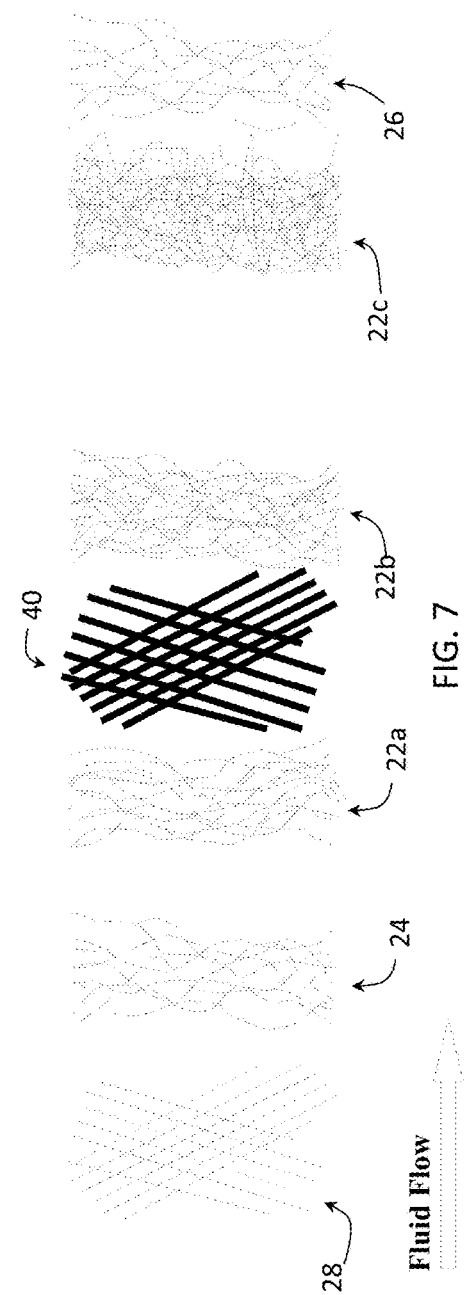
FIG. 6
FIG. 7

CHANNEL DEPTH FILTRATION MEDIA

CROSS REFERENCE TO RELATED APPLICATIONS

This application claims the benefit of U.S. Provisional Patent Application No. 61/754,329 filed Jan. 18, 2013, the content of which is hereby incorporated by reference in its entirety.

FIELD

The present invention relates to fluid filtration media, and more particularly relates to fluid filtration media comprising at least one channel depth layer for increased volumetric filtration capacity while extending filter media life.

BACKGROUND

Existing filter media systems, such as for automotive fuel, comprise multiple fiber layers configured to form a gradient filter structure. Gradient structure filters have fiber layers with decreasing pore size and structure to trap smaller and smaller particles as the fluid flows through the layers. Some of the important aspects of filter design include effectiveness in particulate removal, size proportions suitable for applications, and extended filter life to limit maintenance and related costs. One example where filter life is particularly important is automotive filters located inside the fuel tanks. These filters need to have extended life to increase the duration of usefulness and reduce the need to replace the filter. Replacing such a filter requires the removal of a fuel tank from the vehicle and extensive service time.

SUMMARY OF INVENTION

The present invention provides a fluid filtration media comprising at least one channel depth layer for increased volumetric filtration capacity while extending filter media life. The various forms of the present disclosure provide for increased filter life and improved flexibility including applications requiring extended filter life in high particulate conditions.

In one implementation, the invention may comprise a filter media comprising first and second media layers of non-woven material, and a channel depth layer formed of an extruded mesh material disposed between the non-woven layers. The first and second layers may be comprised of any suitable filtration material, but preferably are comprised of melt blown filaments. The thickness of the channel depth layer may vary from approximately 0.25 mm to 4 mm, while the thickness of the first and second media layers may range from approximately 125 micron to 500 micron. The channel depth layer is disposed between the first and second layers and has a thickness at least 125% greater than the preceding layer to provide support for the non-woven fibers. The channel depth layer may also be formed of a plurality of fibers having a ratio of strand size (micron) to strand count (threads per cm) ranging from 50 to 1000, preferably from 80 to 150, and most preferably about 114.

In this implementation, the channel depth layer may have a nominal thickness ranging from 0.25 mm to 2.5 mm, and in some exemplary implementations, may have a nominal thickness ranging from approximately 0.5 mm to 0.9 mm, and preferably from 0.65 mm to 0.77 mm. The strand size of the channel depth layer may range in diameter from 100 to 1000 micron. In some implementations the strand size may range in diameter from 200 to 600 micron, and most preferably 400 micron. Though the term diameter is discussed in reference to the strand size, it may be understood that strands comprising alternate cross-sectional shapes (e.g. square, rectangular, trapezoidal, etc.) may be similarly implemented with cross-section widths corresponding to the strand size diameter discussed herein. The strands of the channel depth layer are arranged in an intersecting configuration having a first direction and a second direction.

The strand spacing in the first direction may range from 1-6 strands per cm and 1-6 strands per cm in the second direction. In some implementations the strand spacing in the first direction may range from 3-4 strands per cm and 3-4 strands per cm in the second direction. The strands in the first direction may intersect the strands in the second direction at an angle ranging from 45 to 135 degrees, and preferably about 90 degrees. In some implementations, the filtration media may further comprise a third non-woven layer and a second channel depth layer disposed between the second non-woven layer and the third non-woven layer. In other implementations, the channel depth layer may also be either disposed between the first and second non-woven layers or the second and third non-woven layers depending on the implementation. In some implementations a channel depth layer may also be omitted between the first and second or second and third media layers.

The filtration media disclosed herein may further be defined as a gradient depth filtration media, wherein a flow direction through the filter media contacts the first non-woven layer before the second non-woven layer and the porosity of the second non-woven layer is smaller than the porosity of the first non-woven layer. In implementations having a third media layer, the flow direction may also contact the second media layer before the third media layer and the pore size of the third media layer may be smaller than the pore size of the second media layer. In this implementation, the filtration media may further comprise first and second carrier layers sandwiching the first and second media layers. The carrier layers may be constructed of any suitable filtration material, but preferably comprise spun-bond material. The carrier layer may be included in the filter media to provide support to the fragile melt blown filaments.

In another implementation, the invention may comprise a filtration media having a first media layer and a second media layer configured to have decreasing porosity in a flow direction. Between the first and second media layers, a channel depth layer may be disposed comprising a plurality of intersecting fibers defining openings. When fluid flows through the filter media the first media layer may extend into the openings of the channel depth layer. The openings of the channel depth media layer may have a spacing in one direction at least 50 times greater than the strand size of the first media layer. The largest size of the opening is preferably about 2000 micron to 3500 micron, and most preferably about 2700 micron. In order to provide for the first filter media layer extending into the channel depth layer, the channel depth layer may comprise a plurality of strands having a nominal diameter ranging from 100 to 1000 micron, and preferably 200 to 600 micron.

The thickness of the channel depth layer may vary from approximately 0.25 mm to 2.5 mm and in some implementations may range 0.5 mm to 0.9 mm. The thickness of the first and second media layers may range from approximately 200 micron to 600 micron. In general terms, the channel depth layer may be thicker than the first and second media layers and may preferably have a thickness of 125% of the preceding layer. The channel depth layer may also have a ratio of strand size (micron) to strand count (threads per cm) ranging from 50 to 1000, preferably from 80 to 150, and most preferably about 114.

In this implementation, the fibers of the channel depth layer are preferably comprised of extruded mesh. The plurality of fibers may be constructed at a range from 2-6 strands per cm in the first direction and 2-6 strands per cm in the second direction. In some implementations the strand spacing in the first direction may range from 3-4 strands per cm in a first direction and 3-4 strands per cm in a second direction. The first direction may further be angled relative to the second direction. In some implementations, the strand spacing in the first direction may differ from the strand spacing in the second direction.

The angle of intersection between the first fiber direction and the second fiber direction may fluctuate, but may preferably intersect at an angle ranging from 45 to 135 degrees, and preferably about 90 degrees. The fibers may further be connected or formed together at each intersection. This implementation may further comprise a third media layer upstream of the first and second media layers with respect to the flow direction and in some implementations may also include a second channel depth layer disposed between third media layer and the first media layer.

It is also important to note that although the disclosed filter media is capable of being applied at a range of increased flow rates when compared to nominal flow rates for fuel filters, the filter may preferably be applied to systems having flow rates less than 5 liters per minute.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

FIG. 6 is an enlarged, fragmentary sectional view of an implementation of filtration media comprising a single channel depth layer in accordance with the disclosure.

FIG. 7 is an enlarged, fragmentary sectional view of an implementation of filtration media comprising a single channel depth layer in accordance with the disclosure.

DETAILED DESCRIPTION

Figure 1:
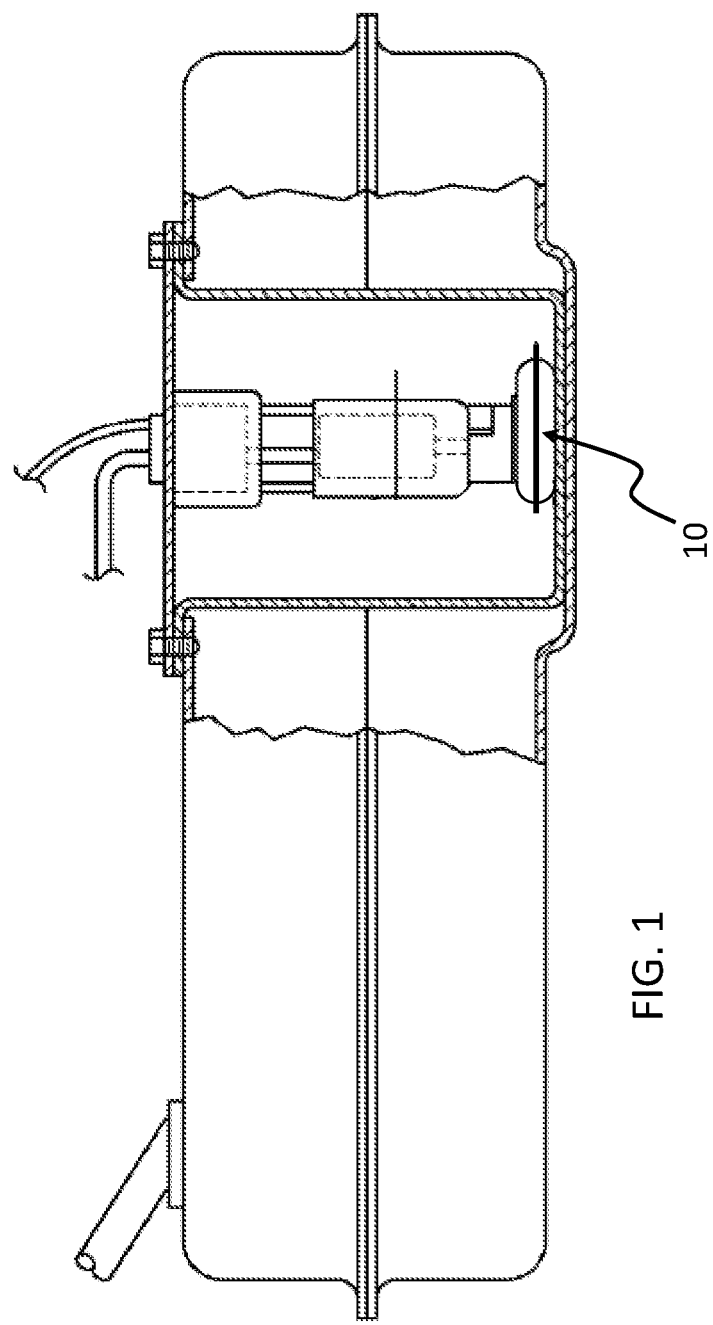
FIG. 1 is a diagrammatic, side elevational view of a motor vehicle fuel tank having a pump module that can incorporate the filtration media described herein.

The filtration media described herein can be utilized in the filtration of a number of fluids including, but not limited to, fuel such as unleaded fuel or diesel fuel, hydraulic fluid, lubrication oil, urea, and other fluids (both liquid and gaseous) where increased filtration life and increasing fluid flow are sought. For convenience the filtration media will be described herein as being for use in fuel filtration. To help describe the concepts of the filtration media, FIG. 1 illustrates an in-tank housed fuel module of a motor vehicle in which the filtration media described herein can be used. The filtration media can be incorporated into the suction filter 10 located at the bottom of the fuel module. The construction and operation of in-tank housed fuel modules is well known in the art. Other uses of the disclosed filtration media are possible and include various fuel filters disposed both inside and outside a fuel tank.

Figure 2:
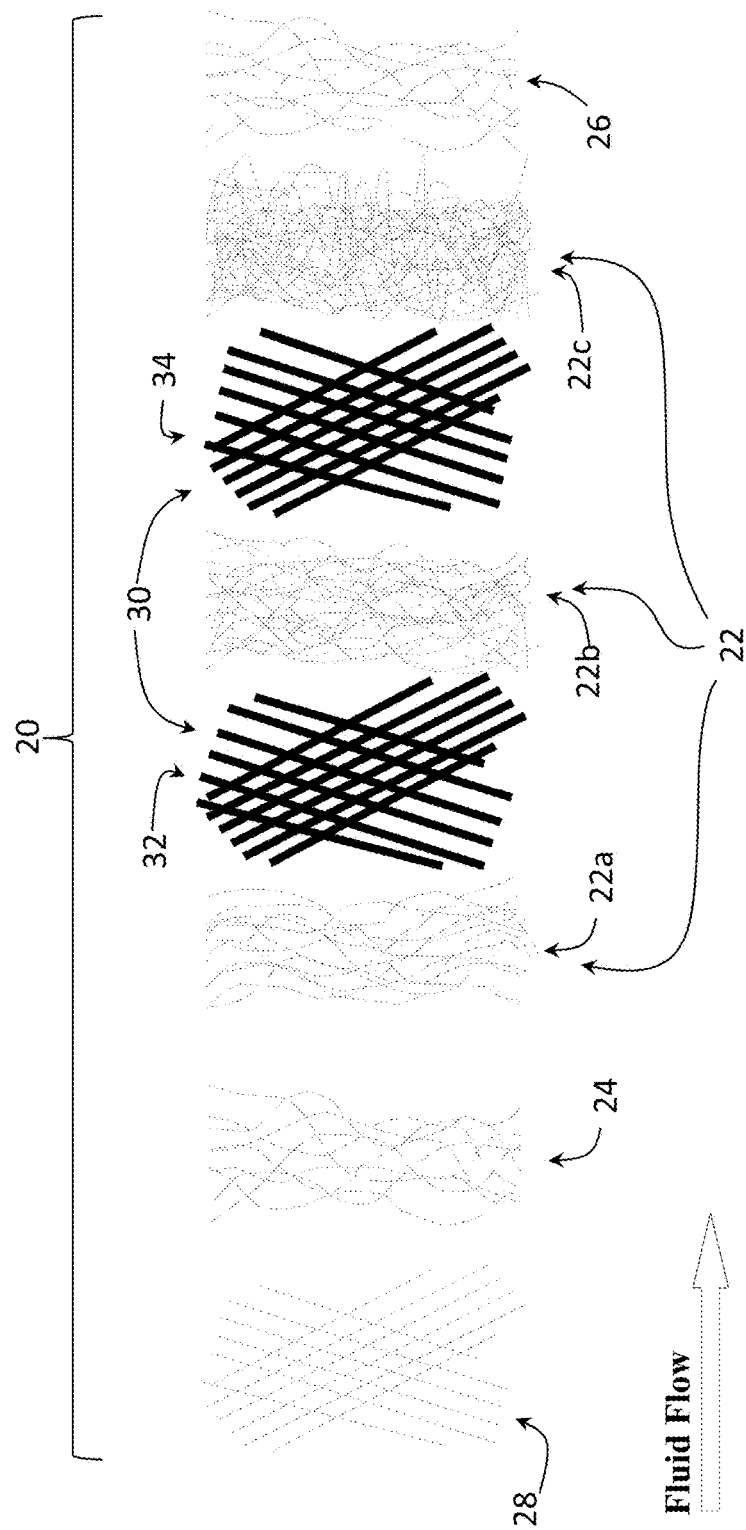
FIG. 2 is an enlarged, fragmentary sectional view of an implementation of filtration media comprising channel depth layers in accordance with the disclosure.

Referring to FIG. 2, an implementation of a filtration media 20 constructed in accordance with the teachings of the present invention is illustrated. The filtration media 20 is an improvement upon filters such as those disclosed in U.S. Pat. No. 5,716,522, the disclosure of which is incorporated herein by reference. The filtration media 20 includes filter media 22 suitable for filtering fuel that is further illustrated as a first media layer 22a, a second media layer 22b, and a third media layer 22c each having decreasing porosity with respect to the fluid flow direction illustrated by the arrow. The filtration media 20 also preferably includes two carrier layers 24 and 26 of non-woven filtration media being shown in FIG. 2. The carrier layers 24, 26 are preferably spun bond and may further comprise static dissipative elements. The filtration media 20 also preferably includes an exterior shell layer 28.

The filter media 22 may be any media that is suitable for filtering the fluid with which the filtration media 20 is used. In the case of fuel, the filter media 22 may be any of a number of media that are known to those of skill in the art to be sufficient for filtering fuel. For example, the filter media 22 may be a gradient depth filter media comprising a plurality of non-woven layers 22a, 22b, 22c preferably of melt blown filaments. In some implementations the filter media may comprise a single media layer or multiple media layers that are not gradient in structure. The layers 22a-22c are arranged by decreasing filament and pore size in the direction of fuel flow to provide graduated filtration of particulate matter. As a result, the first media layer 22a has a first porosity, the second media layer 22b has a lower porosity, and the third media layer 22c has the lowest porosity. Examples of gradient density melt blown filter media layers are well known in the art, suitable examples of which are disclosed in the following references: U.S. Patent Application Publication Nos. 2006/0266701, U.S. Pat. No. 6,613,227, and U.S. Pat. No. 7,927,400. The above listed references are incorporated herein by reference in their entirety.

The exterior shell layer 28 of the filtration media 20 is preferably comprised of extruded mesh of any suitable fuel tolerant and impervious material, e.g. nylon, polyester, acetal or Teflon™, although it may also be constructed from any non-woven or woven material exhibiting sufficient durability. The relative coarseness of the exterior shell layer 28 provides an exceptionally stable and abrasion resistant outer covering for the filtration media 20. Although the exterior mesh layer 28 is extruded, it has the appearance of a woven fabric. The interstices of the filaments are highly uniform because the warp filaments and weft filaments are connected or integrally formed at each intersection. This configuration results in the exterior mesh layer of extruded mesh having exceptional dimensional stability due its resistance to pantographing and ruggedness due to the strength of the mesh and its excellent abrasion resistance. As used here, the term pantographing refers to the tendency or ability of swatches of woven material to distort and collapse like a pantograph when sides of the swatch are pulled or pushed. One implementation of the exterior shell that may be employed herein relates to U.S. Pat. No. 5,902,480 which is further incorporated herein by reference.

The carrier layers 24 and 26 of the filtration media 20 may be comprised of spunbonded nylon filaments, but may also be spunbonded polyester, acetal, Teflon™, or other stable fuel tolerant material. As utilized herein the terms spunbonded filaments and spunbonded filtration media refer to that class of non-woven materials wherein the filaments are cooled by the application of cold air immediately upon forming to stop attenuation thereof. The diameters of such filaments may be approximately 100 microns but also may range between 50 and 200 microns.

The carrier layers 24 and/or 26 may further comprise static dissipative elements. As used herein, the terms static dissipative and static dissipative elements refer to that class of materials that are classified as being static dissipative by the ESD Association. According to the ESD Association, a material is classified as being static dissipative when it has a surface resistivity equal to or greater than $1 \times 10^5$ Ω/sq but less than $1 \times 10^{12}$ Ω/sq or a volume resistivity equal to or greater than $1 \times 10^4$ Ω/cm2 but less than $1 \times 10^{11}$ Ω/cm2. An example of an implementation of static dissipative layers in filtration media is U.S. Pat. No. 6,613,227 incorporated herein by reference in its entirety.

For static dissipative materials, charges flow to ground more slowly and in a somewhat more controlled manner than with conductive materials. It is important to realize that a material can dissipate static, yet not be classified as static dissipative. A number of materials that would be classified as conductive according to the ESD Association meet this criteria. The static dissipative fibers can comprise single component materials such as carbon or metallic fibers. In approximate circumstances, carbon or metallic powder or particles could be used, as could inherently dissipative polymers.

The filter media 22 may be comprised of melt blown filtration media decreasing in porosity in the direction of fluid flow. The first media layer 22a of melt blown filtration media is disposed adjacent the carrier layer 24, and comprises filaments having a nominal diameter greater than 10 microns and preferably in the range of about 10 to 25 microns. Adjacent the first media layer 22a is the second media layer 22b of melt blown filtration media having a nominal filament size of about 10 microns and preferably in the range of about 5 to 15 microns. Adjacent the second media layer 22b is a third media layer 22c of melt blown filtration media having a nominal filament size of less than 10 microns and preferably in the range of about 1 to 5 microns. As utilized herein, the terms melt blown filaments and melt blown filtration media refer to that class of non-woven materials wherein the filaments are maintained at an elevated temperature by the application of hot air immediately upon forming to encourage attenuation thereof. Typically, melt blown filaments are on the order of ten times smaller than spunbonded filaments and thus are nominally 10 microns in diameter and may readily be in the range of 5 to 20 microns. It should be appreciated that the filament sizes recited are by way of example and illustration only and are not intended to be limiting.

It is to be noted that although there are gaps shown between the layers in the figures (e.g. FIGS. 2 and 6-8), this is for convenience in describing the filtration media 20. In actual practice, there will be no (or at least minimal) gaps between the various layers. The carrier layers 24 and 26 can be co-rolled with the filter layers 22a-22c and bound thereto using heat, mechanical weld, glue or binding agent. Likewise, the filter layers 22a-22c can be bound to the carrier layer 26 using heat, mechanical weld, glue or binding agent.

A limitation of prior art filtration media has been discovered and is disclosed herein to highlight the improvement on prior art filter media designs. In particular it has been discovered that prior filtration media lose capacity due to collapse among the filter media layers and in particular among the interior, melt blown layers. It has been discovered that, when fluid flow passes through the media layers, the first media layer can become compressed into the second media layer, and likewise the second media layer can become compressed into the third media layer, etc. The preferred solution in the filter industry does not account for collapse in the filter media. An initial attempt to improve filter life by increasing the loft and fiber count of the respective media layers did not prevent the collapse among the filter media layers.

Similarly, prior art filtration media designs suggest increased filter proportions to increase particulate holding capacity, e.g. increasing the thickness of the interior melt blown layers; however, increasing the proportions of the filter is undesirable for fuel filter applications requiring limited space. Contrary to prior filtration media, this disclosure provides for improved filter life while maintaining performance and decreasing the requirement of additional thickness, filter proportions, and fiber size that have been previously considered necessary to improve filter life.

Referring again to FIG. 2, an implementation of filtration media comprising channel depth layers 30, in accordance with the disclosure, is illustrated. A first channel depth layer 32 is disposed between the first media layer 22a and the second media layer 22b, and a second channel depth layer 34 is disposed between the second media layer 22b and the third media layer 22c. In this implementation, when fluid flow passes through the filtration media 20, the first media layer 22a contacts the first channel depth layer 32. Conventional filter design would suggest that the channel depth layer would reduce filter life because it would limit the effectiveness of the first media layer 22a. Contrary to conventional teachings, it has been discovered that the first media contacts the first channel depth layer 32 and maintains effectiveness that would normally be lost due to collapse into the second media layer 22b.

In particular, improved filtration life when applying a channel depth layer 30 between media layers 20 is now understood to be due to increased capacity among media layers 22 that are supported by the enlarged pore openings in the channel depth layers 30. As the fluid pressure forces the first media layer into the first channel depth layer 32, the fibers of the first media layer 22a remain effective in filtration by extending into openings in the first channel depth layer 32. The openings in the channel depth layers 30 provide support for the upstream first media layer 22a rather than allowing the first media layer 22a to collapse into the second media layer 22b and suffer from reduced capacity due to collapse.

The life of the disclosed filtration media 20 is further increased by improved load handling as contaminants build throughout the lifetime of the filtration media 20. As the filtration media loads with the dust and contaminants, the pressure build up in the filtration media 20 due to restricted fluid flow causes the first media layer 22a to press against the first channel depth layer 32. The first media layer 22a stretches into the openings of the first channel depth layer 32, allowing the non-woven fibers of the first media layer 22a to release trapped dirt to the second media layer 22b and extend the dust holding ability of the filtration media 20. By sharing the trapped dust among the media layers, the disclosed filtration media 20 including channel depth media 30 is capable of capturing more dust in the filter layers 22 than conventional media that does not include a channel depth layer 30.

The present implementation preferably further includes the second channel depth layer 34 disposed between the second media layer 22b and the third media layer 22c. Similar to the first media layer 22a, the second media layer 22b is forced against the second channel depth layer 34 when fluid pressure is applied and maintains efficiency that would otherwise result from collapse into the third media layer 22c.

The channel depth layers 30 of the filtration media 20 may be comprised of extruded mesh of any suitable fuel tolerant and impervious material, e.g. nylon, polyester, acetal or Teflon™. Though extruded mesh is specified, in other implementations channel depth layers may be comprised of other materials including woven materials, punched film, formed materials, injection molded materials, etc. The channel depth layers 30 may further comprise a plurality of fibers having a strand size from 100 micron to 1000 micron which provides for added stability, but more importantly allows for the media layers 22 to extend into the openings in the channel depth layers 30 and not collapse into an adjacent media layer 22. In a preferred embodiment, the average strand size of the channel depth layer may be 400 micron. The fibers of the channel depth layers 30 appear to be woven, due to the intersecting configuration of the warp and weft fibers (see FIGS. 3, 3A and 3B), but the fibers in this implementation are actually connected or integrally formed at each intersection. The connections among the fibers provide for highly uniform spacing among the fibers or strands and exceptional dimensional stability due to the resistance of the mesh to pantographing.

Figure 3A:
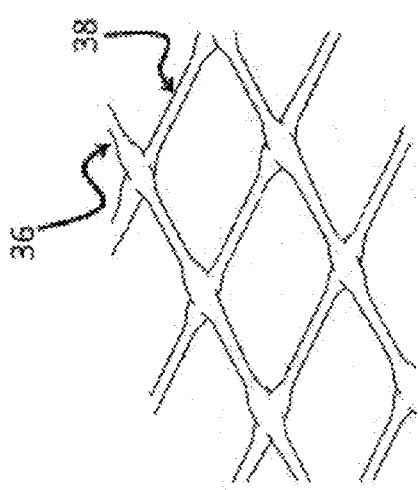
FIG. 3A is a detailed pictorial view of another embodiment of a channel depth layer in accordance with the disclosure.
Figure 3B:
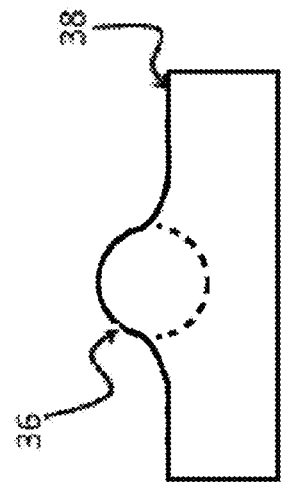
FIG. 3B is a partial side view of FIG. 3A.
Figure 3:
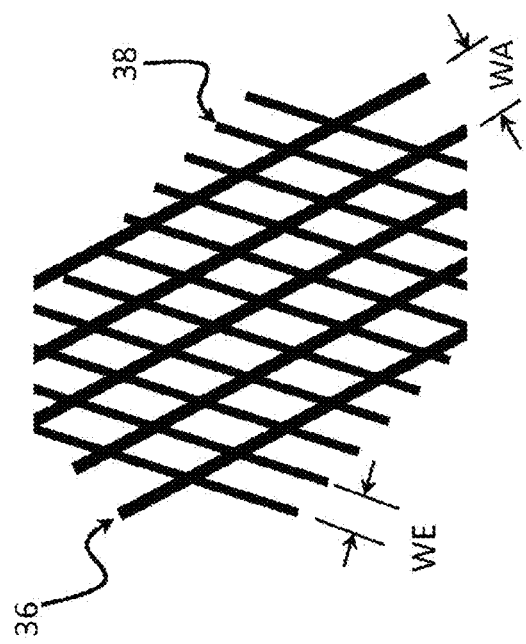
FIG. 3 is a detailed pictorial view of a preferred embodiment of a channel depth layer in accordance with the disclosure.

Referring now to FIGS. 3, 3A and 3B, a detailed pictorial view of preferred embodiments of channel depth layer 30 are shown in accordance with the teachings of the disclosed invention. Each of the strands of the channel depth layers 30 may be constructed with substantially uniform spacing from 3-4 strands per cm in a warp direction 36, and a substantially uniform spacing from 3-4 strands per cm in a weft direction 38. "Substantially uniform" includes some natural variation in the strands spacing and maintaining parallel alignment, such as 15% variation, as is known in the art. In one preferred implementation, the average spacing among the strands may be 1-6, preferably 3-4, strands per cm in the warp direction 36, and 1-6, preferably 3-4, strands per cm in the weft direction 38. The strands in the first direction may intersect the strands in the second direction at an angle ranging from 45 to 135 degrees, and preferably about 90 degrees. Though the warp and weft directions are denoted herein for reference, the terms are used to promote understanding and it should be understood that the directional terms applied herein for the woven material may be used interchangeably for equivalents. Another illustrative implementation of the channel depth layer warp and weft fibers may comprise the warp stand spacing WA ranging from 2 mm to 4 mm and the weft strand spacing WE ranging from 1 mm to 3 mm.

The diameter of the warp and weft strands may vary from approximately 100 to 1000 micron in diameter. In one preferred embodiment, the warp strands may range from 200 to 600 micron in diameter, while the weft strands may vary from 200 to 600 micron in diameter. In yet another implementation, the nominal diameter of the warp strands may be 400 micron while the nominal diameter of the weft strands may be 400 micron. In view of the foregoing, the openings of the channel depth media layer may have a spacing in one direction at least 50 times greater than the strand size of the first media layer. The largest size of the opening is preferably about 2000 micron to 3500 micron, and most preferably about 2700 micron.

FIG. 3A depicts the strands of the warp direction 36 being angled about 90 degrees from the strands of the weft direction 38. Due to the forming process, such as extrusion or other molding techniques, the fibers are connected, and preferably integrally or unitarily formed, at each intersection. This integral formation between the directional strands 36, 38 at each intersection is shown in FIG. 3B, and may result in the thickness of the channel depth layer 32 being less than the combined diameter of the strands. For example, while the strands may have a nominal diameter of about 200-600 micron, the thickness of the channel depth layer 32 may in the range of about 0.25 mm to 0.90 mm (slightly less than the combined diameter of 400-1200 micron).

Other implementations of the disclosed invention may vary from the exemplary ranges described herein and remain consistent with the spirit of the disclosed invention. For example, in some implementations, the warp strands 36 may be larger in both diameter and spacing than the weft strands 38 (e.g. by a 3:2 or 2:1 ratio), while the weft strands may have a more strands per cm than the warp strands. In some implementations, the warp strands may have the same diameter and spacing as the weft strands. The channel depth layer may also be formed of a plurality of fibers having a ratio of strand size (micron) to strand count (threads per cm) ranging from 50 to 1000, preferably from 80 to 150, and most preferably about 114.

Figure 4:
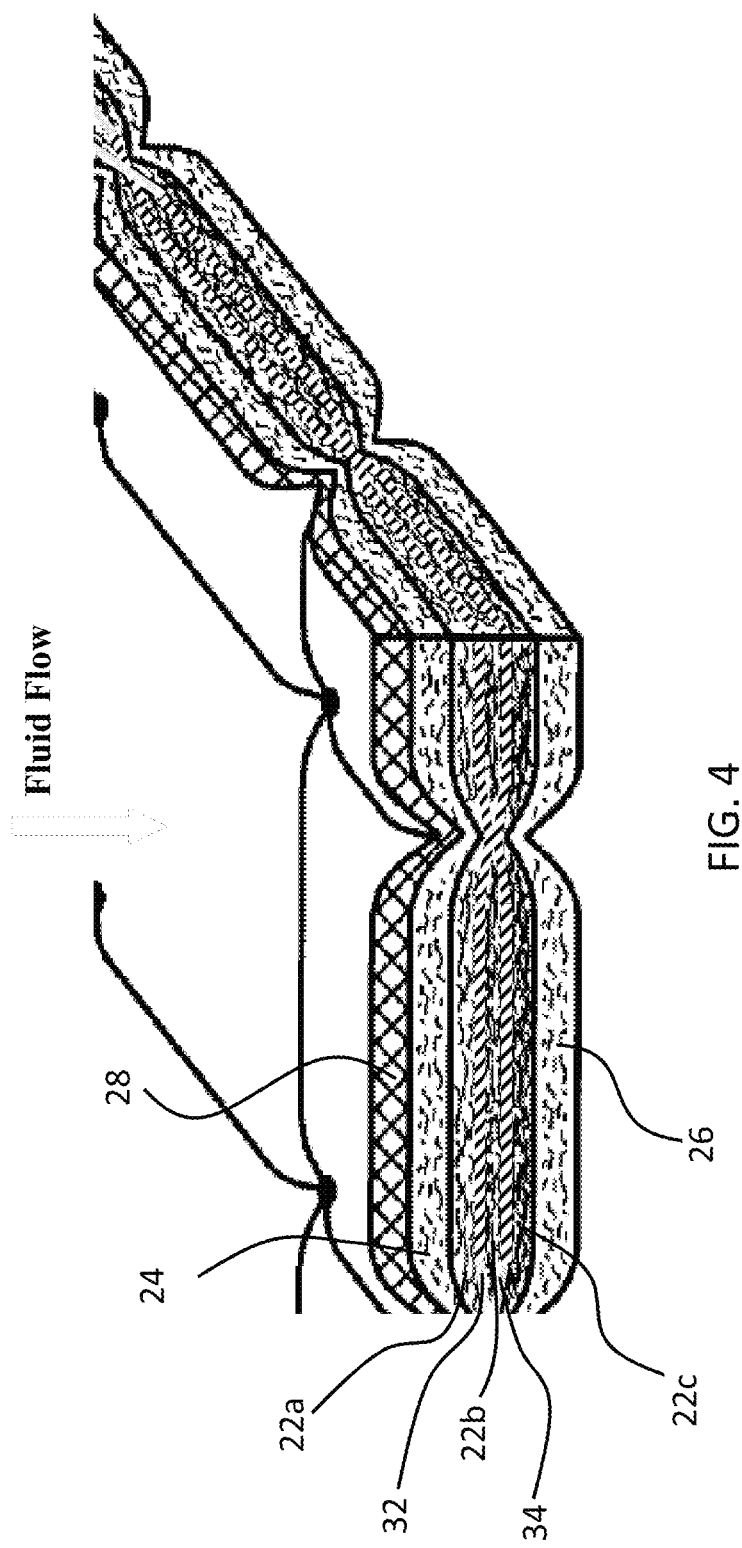
FIG. 4 is a cross-sectional view of filtration media comprising channel depth layers in accordance with the disclosure.
Figure 5:
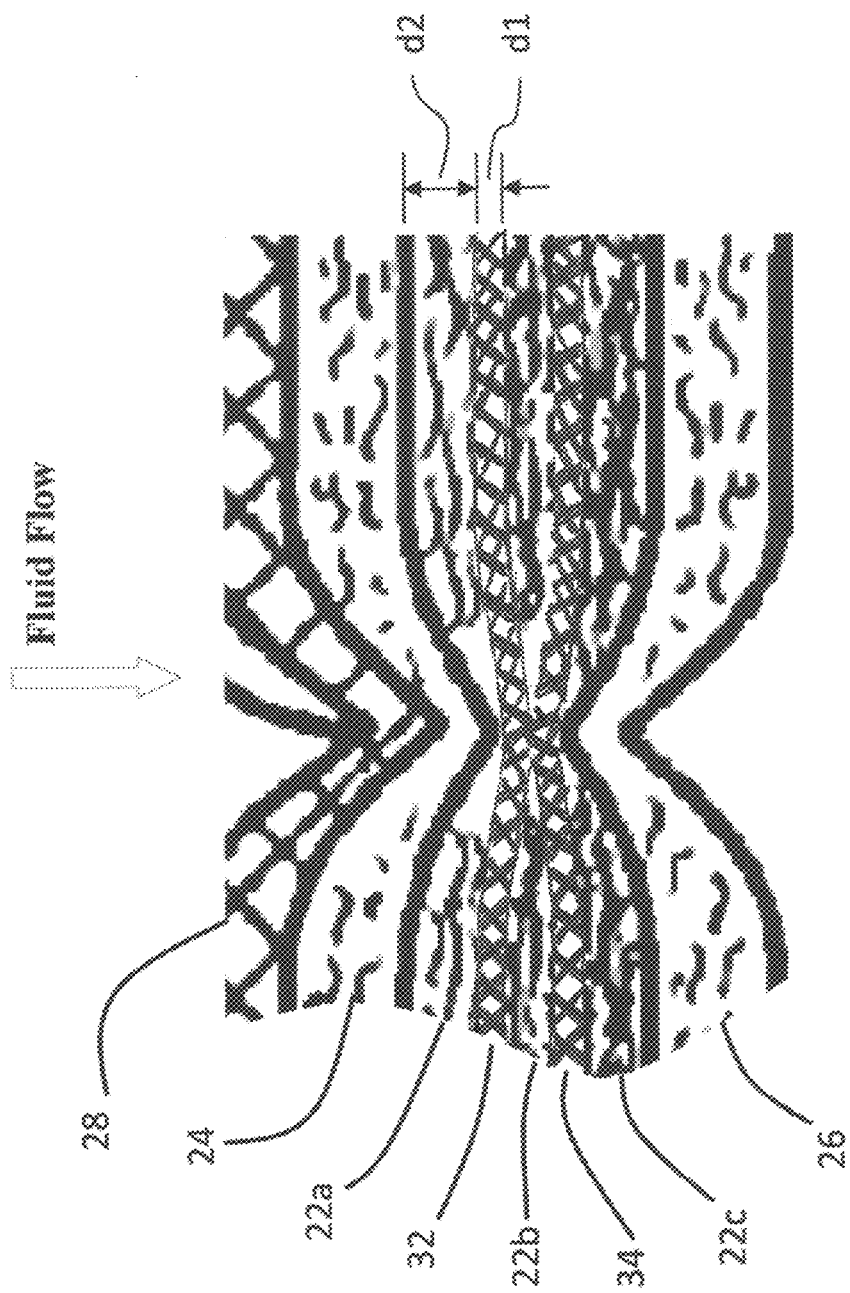
FIG. 5 is a detailed cross-sectional view of filtration media comprising channel depth layers in accordance with the disclosure.

Referring to FIGS. 4 and 5, cross-sectional views of filtration media 20 implementation of FIG. 2 are shown. The filtration media 20 comprises a first channel depth layer 32 disposed between the first media layer 22a and the second media layer 22b, and a second channel depth layer 34 disposed between the second media layer 22b and the third media layer 22c. In a preferred implementation the thickness d1 of the first channel depth layer 32 is at least 125% of the thickness d2 of the preceding media layer 22a. The channel depth layer 32 may have a thickness d1 in the range of about 0.25 mm to 2.5 mm, and preferably 0.50 mm to 0.90 mm. The preceding media layer 22a may have a thickness d2 in the range of about 125 micron to about 500 micron. In one exemplary implementation the thickness d1 of the channel depth layer 32 may be approximately 0.65 mm to 0.77 mm. In most instances the channel depth layer should be thicker than the preceding media layer. The relationships between a channel depth layer 30 and a preceding media layer 22 may be applied to other applications of channel depth layers 30 and upstream media layers 22 disclosed herein (e.g. the second channel depth layer 34 and the second media layer 22b).

Referring to FIGS. 6 and 7 other implementations of filtration media 20 comprising a single channel depth layer 40 are illustrated in accordance with the disclosure. Referring to FIG. 6, a single channel depth layer 40 is disposed between the second media layer 22b and the third media layer 22c. Referring to FIG. 7, a single channel depth layer 40 is disposed between the first media layer 22a and the second media layer 22b.

The implementations of FIGS. 6 and 7 demonstrate similar characteristics of improved media layer 20 efficiency and improved life, illustrated in FIG. 2, while only applying a single depth channel layer 40. These implementations further demonstrate the benefit of the disclosure by allowing for increased filter life even under increased flow rate conditions while decreasing the thickness and fiber count. These implementations also provide for increased filter life while not requiring increased filter size proportions. The instant implementations may be applied in present filtration applications to allow for increased filter life while conforming to the limited size proportions available in modern fuel systems. The disclosed implementations are exemplary in nature and should not be considered limiting to the disclosure.

Figure 8:
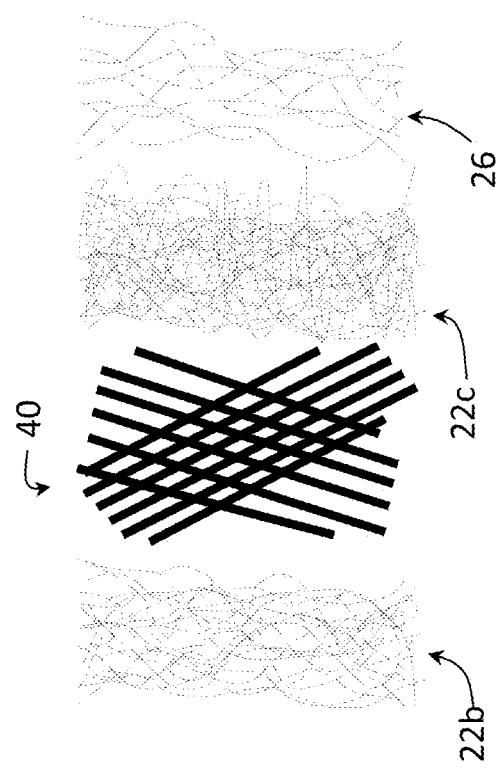
FIG. 8 is an enlarged, fragmentary sectional view of a preferred implementation of filtration media comprising a single channel depth layer in accordance with the disclosure.
Figure 8:
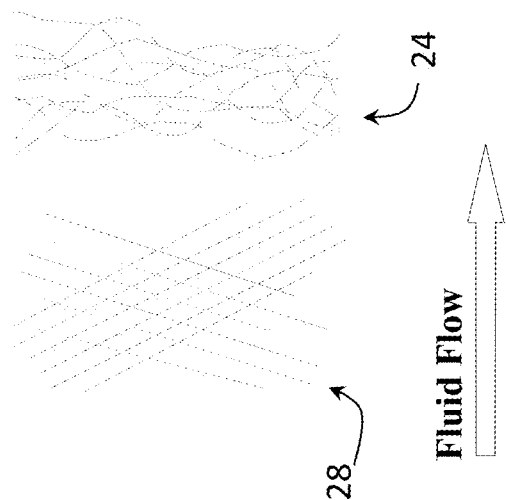

Referring now to FIG. 8, a preferred implementation of filtration media comprising a single channel depth layer 40 and reduced media layers 22 is illustrated in accordance with the disclosure. In this implementation a single channel depth layer 40 is disposed between the second media layer 22b and the third media layer 22c. The first media layer 22a is omitted from this implementation. This example further exemplifies the benefits of the disclosed channel depth layers 30 disposed between filter media layers 22. This implementation allows for further reduction in filter size proportions for improved implementation into fuel filters and improved filter life.

The filtration media described herein may be embodied in other forms without departing from its spirit or characteristics. The described embodiments are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A filtration media comprising:
   a first media layer formed of a non-woven material;
   a second media layer, distinct from the first media layer, formed of a non-woven material; and
   a channel depth layer formed of an extruded mesh material disposed between, and contacting, the first non-woven layer and the second non-woven layer.

2. The filtration media of claim 1, wherein the channel depth layer has a thickness in the range of approximately 0.25 mm to 2.5 mm, and wherein the first and second media layers have a thickness in the range of about 125 micron to about 500 micron, the channel depth layer being thicker than the first and second media layers.

3. The filtration media of claim 1, wherein the channel depth layer is formed of a plurality of fibers having a ratio of strand size (micron) to strand count (threads per cm) ranging from 80 to 150.

4. The filtration media of claim 1, wherein the channel depth layer is at least 125% of the thickness of the preceding media layer.

5. The filtration media of claim 1, wherein the channel depth layer comprises a plurality of strands having a nominal diameter ranging from 200 to 600 micron.

6. The filtration media of claim 1, wherein the channel depth layer has a nominal thickness range of approximately 0.5 mm to 0.9 mm.

7. The filtration media of claim 1, wherein the channel depth layer is formed of a plurality of fibers constructed at 2-6 strands per cm in a first direction and 2-6 strands per cm in a second direction angled relative to the first direction.

8. The filtration media of claim 1, wherein the non-woven layers comprise melt blown filaments.

9. The filtration media of claim 1, wherein a flow direction through the filter media contacts the first non-woven layer before the second non-woven layer and the porosity of the second non-woven layer is smaller than the porosity of the first non-woven layer.

10. The filtration media of claim 1, further comprising a third non-woven layer.

11. The filtration media of claim 10, further comprising a second channel depth layer disposed between the second non-woven layer and the third non-woven layer.

12. The filtration media of claim 10, wherein a channel depth layer is not disposed between the third non-woven layer and the second non-woven layer.

13. The filtration media of claim 10, wherein a flow direction through the filter media contacts the second media layer before the third media layer and the pore size of the third media layer is smaller than the pore size of the second media layer.

14. The filtration media of claim 1, further comprising first and second carrier layers sandwiching the first and second media layers therebetween, the first and second carrier layers being a spun-bond material.

15. The filtration media of claim 1, wherein the filter operates at flow rates less than 5 liters per minute.

16. A filtration media comprising:
    a first media layer and a second media layer, distinct from the first media layer, configured to have decreasing porosity in a flow direction; and
    a channel depth layer comprising a plurality of intersecting fibers defining openings, the channel depth layer disposed between, and contacting, the first media layer and the second media layer, the openings having a spacing in one direction that is at least 50 times greater than the strand size of the first media layer.

17. The filtration media of claim 16, wherein the channel depth layer has a thickness in the range of approximately 0.25 mm to 2.5 mm, and wherein the first and second media layers have a thickness in the range of about 125 micron to about 500 micron, the channel depth layer being thicker than the first and second media layers.

18. The filtration media of claim 16, wherein the channel depth layer is formed of a plurality of fibers having a ratio of strand size (micron) to strand count (threads per cm) ranging from 80 to 150.

19. The filtration media of claim 1, wherein the channel depth layer has a nominal thickness range of approximately 0.65 mm to 0.77 mm.

20. The filtration media of claim 1, wherein the channel depth layer is formed of a plurality of fibers constructed at 3 to 4 strands per cm in a first direction and 3 to 4 strands per cm in a second direction angled relative to the first direction.

21. The filtration media of claim 20, wherein a largest size of the openings is about 2000 to 3500 micron.

22. The filtration media of claim 21, wherein the first and second directions intersect and are connected at a plurality of intersections.

23. The filtration media of claim 1, wherein the channel depth layer defines openings having a spacing in one direction that is at least 50 times greater than the strand size of the first media layer.

* * * * *